United States Patent Office 3,516,283
Patented June 23, 1970

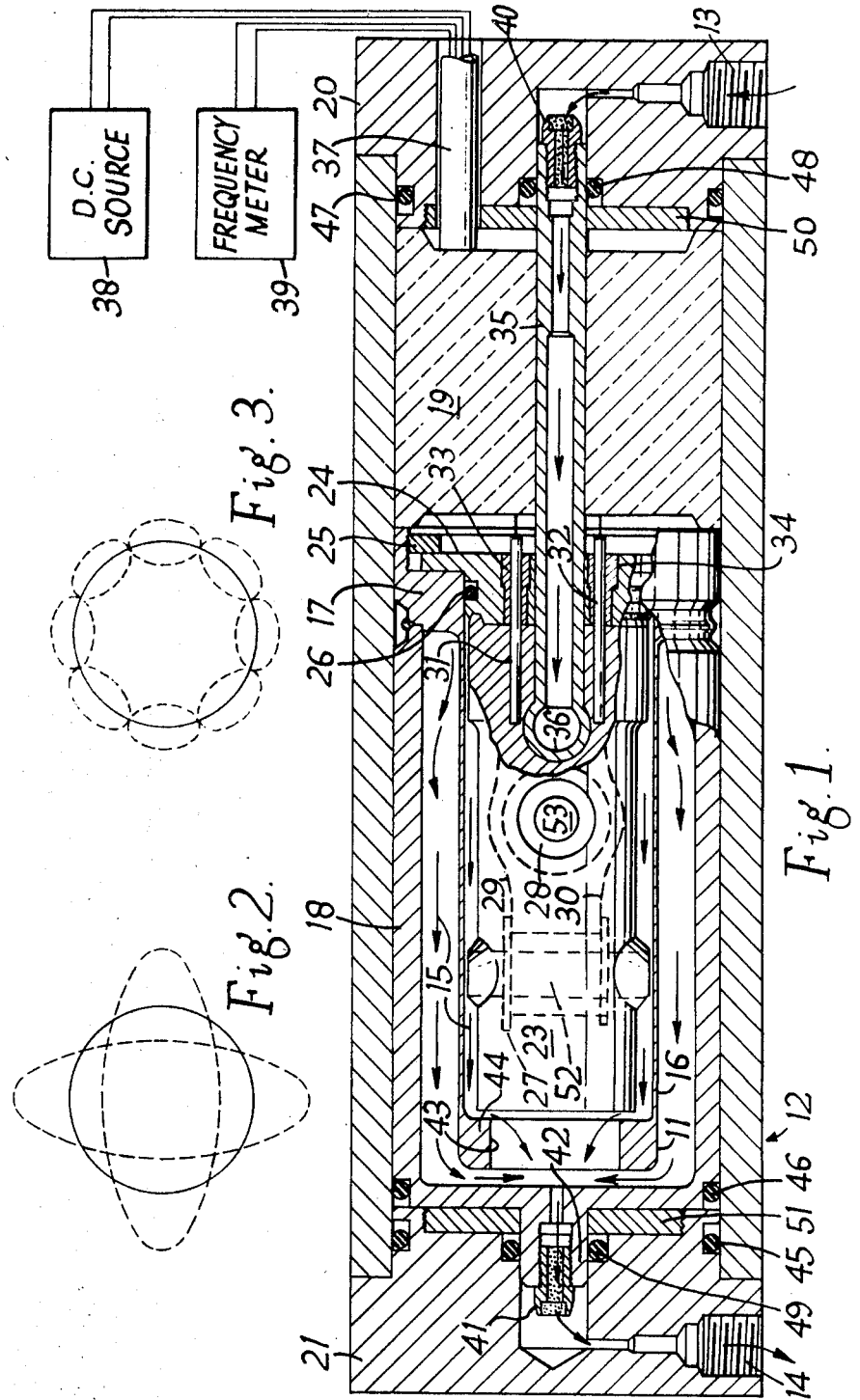

3,516,283
METHODS AND APPARATUS FOR MEASURING THE DENSITIES OF FLUIDS BY VIBRATING A HOLLOW BODY SURROUNDED BY THE FLUID
William Edward Abbotts, Farnborough, England, assignor to The Solartron Electronic Group Limited, Farnborough, England, a corporation of the United Kingdom
Filed Jan. 25, 1967, Ser. No. 611,632
Claims priority, application Great Britain, Jan. 28, 1966, 4,042/66
Int. Cl. G01n 9/00
U.S. Cl. 73—30
12 Claims

ABSTRACT OF THE DISCLOSURE

A density meter for measuring the density of a gas, having a hollow cylinder which is set into bell-like vibration when the gas is in contact with the cylinder both internally and externally to avoid differential pressure, or the cylinder walls are so thick that a gas or liquid can be applied to an internal or external surface alone, in each case the predominant frequency being measured.

---

This invention relates to methods of measuring the densities of fluids and apparatus therefor.

It has been found that the frequencies of the natural bell-like vibrations excited when a hollow body of resilient material is, for example, struck vary with the density of a fluid which is in contact with a predetermined region of the hollow body. The predominant frequency of such vibrations, that is, the frequency of the vibrations containing most energy, is thus related to the density of such a fluid.

According to the present invention a method of measuring the density of a fluid comprises the steps of bringing the fluid into contact with a predetermined region of a hollow body formed of resilient material, exciting natural vibrations of the body, rendering a frequency of the vibrations substantially insensitive to variations in differential pressure exerted on the predetermined region at least within a given range of pressure and measuring the said frequency.

Also according to the present invention a density meter for measuring the density of a fluid includes a hollow body of resilient material, means for exciting natural vibrations of the hollow body, and means for generating a signal representative of a frequency the said vibrations, the hollow body being such as to permit the application of the fluid to at least part of a wall thereof, the wall being of such thickness that the said frequency is substantially insensitive to variations in differential pressure exerted thereon within a given range of pressure.

Further according to the present invention, a density meter for measuring the density of a fluid includes a hollow body of resilient material, means for exciting natural vibrations of the hollow body, and means for generating a signal representative of a frequency of the said vibrations, the hollow body being such as to permit application of the fluid to external and internal surfaces of the hollow body at equal pressures.

The invention will now be further described by way of example with reference to the accompanying drawings in which:

FIG. 1 shows partially in section a first embodiment of the invention;

FIG. 2 illustrates natural bell-like vibrations of the hollow body of the first embodiment;

FIG. 3 illustrates further natural bell-like vibrations of the hollow body of the first embodiment;

Figure 4:
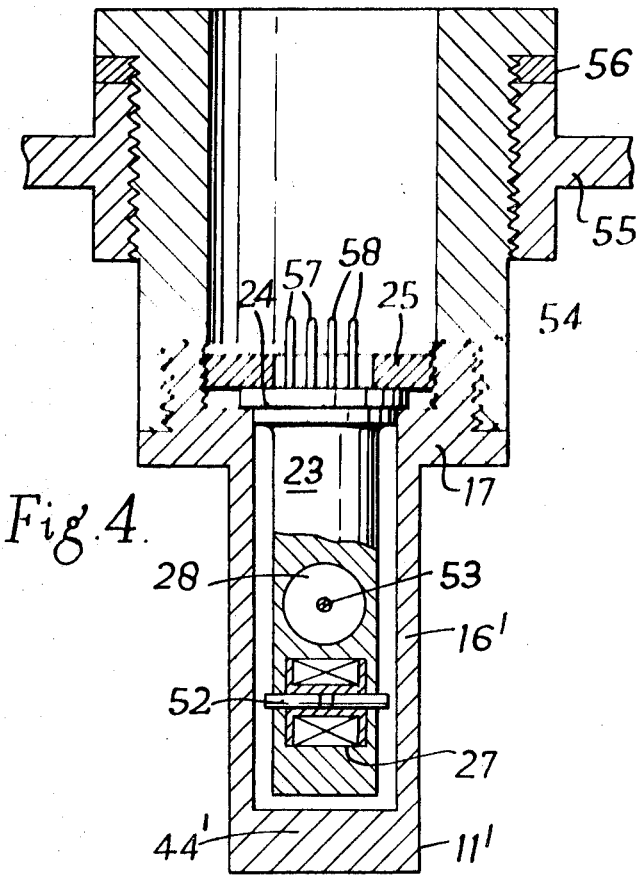
FIG. 4 is a simplified sectional view of part of a second embodiment of the invention.

Referring to FIG. 1, there is shown a density meter for measuring the density of a gas. A cylindrical tube 11 formed of ferromagnetic metal, such as Ni-Span-C 902 (trademark), is secured within a chamber 12 having an inlet port 13 and an outlet port 14. The directions of flow of the gas in operation are indicated by arrows as, for example, at 15. The cylindrical wall 16 of the tube 11 is integral with a flange 17 which fits slidingly within the chamber 12. The flange 17 is located between a chamber-lining member 18, to which the flange 17 is welded, and an amplifier 19. The chamber-lining member 18 and the amplifier 19 also fit slidingly within the chamber 12. The ends of the chamber 12 are formed by tightly fitted end members 20 and 21.

A cylindrical supporting body 23 of thermostat synthetic resin bonded to a metal end plate 24 is located coaxially within the tube 11, a flange on the end plate 24 being held against the flange 17 by a retaining ring 25 screw-threadedly engaged in a skirt formed on the flange 17. An O-ring 26 provides a gas-tight seal between the end plate 24 and the inner surface of the tube 11.

A drive coil 27 and a pick-up coil 28 are so embedded in the body 23 that their axes are mutually perpendicular and are respectively perpendicular to the longitudinal axis of the tube 11. The body 23, the drive coil 27 and the pick-up coil 28 are arranged to be clear of the walls of the tube 11 in order that the tube may vibrate without striking the body 23 and the coils 27 and 28. Leads 29 and 30 from the output circuit of the amplifier 19 enter the body 23 through a conduit 31, leads (not shown) from the pick-up coil 28 to the amplifier 19 leave the body 23 through a further conduit 32. The conduits 31 and 32 are located in insulating bushes 33 and 34 in the end plate 24.

A metal pipe 35 extends from the end closure member 20, through the amplifier 19 and the end plate 24, and into the body 23 where a further pipe 36 is secured in communication therewith. The further metal pipe 36 lies with its axis parallel to the axis of the pick-up coil 28 and its ends are open so that gas from the pipe 35 can flow into the space between the body 23 and the tube 11.

Small circular holes (not shown) formed in the wall 16 near to the flange 17 allow gas to pass from the space within the tube 11 to the space between the tube 11 and the chamber lining member 18.

A screened four-core cable 37 passes through the end-closure member 20 to the amplifier 19, two of the conductors of the cable serving to couple a DC source 38 to the amplifier 19, and the other two conductors serving to couple the output circuit of the amplifier to a frequency meter 39. The screen of the screened four-core cable 37 is electrically connected to the chamber 12 and to respective common-rail conductors of the amplifier 19 and the frequency meter 39.

In operation, gas flows from the inlet port 13 to the pipe 35 through a filter 40. Before leaving the chamber 12 by way of the outlet port 14, gas passes through a further filter 41. Each of the filters 40 and 41 comprises an externally screw-threaded body having a passage therethrough which houses a mass of sintered metal powder. The filter 40 is screw-threadedly engaged in one end of the pipe 35, and the filter 41 is screw-threadedly engaged in a tubular projection 42 integral with the chamber-lining member 18. Gas entering the space between the body 23 and the wall 16 from the tube 36 escapes from the said space both by way of the small holes in the wall 16 as mentioned hereinbefore and by way of a circular opening 43 in the end wall 44 of the tube 11 remote from the flange 17. The circular opening 43 is coaxial with the body 23 in order that gas may flow equally between the body 23 and the end wall 44 of the tube at all points of the gap between the end wall 44 and the body 23.

O-rings 45, 46, 47, 48 and 49 are included in the chamber 12 to provide gas tight seals. The O-rings 48 and 49 are retained within the end closure members 20 and 21 respectively by discs 50 and 51 respectively. The discs 50 and 51 are screw-threadedly engaged in the end closure members 20 and 21 respectively, and are provided with central apertures, the tubular projection 42 being located in the central aperture of the disc 51 and the tube 35 being located in the central aperture of the disc 50. The cable 37 passes through a further aperture in the disc 50.

The drive coil 27 and the pick-up coil 28 are provided with respective composite cores 52 and 53. Each composite core comprises a cylindrical permanent magnet equipped with soft iron pole pieces, the length of the magnet being approximately one-seventh the length of each pole piece. The perpendicular relationship of the axes of the drive coil 27 and the pick-up coil 28 provides a low degree of direct coupling between the drive coil 27 and the pick-up coil 28.

In operation, natural bell-like vibrations of the tube 11 are excited and maintained by virtue of feedback from the pick-up coil 28 to the drive coil 27 through the amplifier 19. The vibrations are initiated by mechanical noise transmitted to the tube 11 or by electrical noise occurring in the drive coil 27 when the amplifier is switched into action. The end wall 44 and the flange 17 are sufficiently thick for nodes to be present at the ends of the tube 11 during such vibrations. FIGS. 2 and 3 illustrates two forms of such vibrations, FIG. 2 showing the form of the vibrations having the fundamental frequency. The continuous lines indicate the undisturbed cross-section of the cylindrical wall 16, the broken lines indicating extreme conditions of the wall 16 during natural bell-like vibrations in FIGS. 2 and 3. It will be realised that in practice, the natural bell-like vibrations may be a combination of the forms of vibration shown in FIGS. 2 and 3 and other such forms.

The predominant frequency of the natural bell-like vibrations of the tube 11 is measured by means of the electrical frequency meter 39, the frequency of the current supplied to the drive coil 27 being the same as the predominant frequency of the vibrations of the tube 11. The frequency meter 39 is a conventional electrical frequency meter adapted to cover the range of predominant frequencies anticipated for the operation of the density meter and can be calibrated to read directly in density units from a calibration graph prepared from frequencies obtained when the tube 11 is excited in contact with gases having standard densities.

The effect of the pressure of the gas on the predominant frequency of the vibrations of the tube 11 is negligible since the gas is applied both internally and externally to the tube 11. Pressure differences axially of the tube 11 associated with the flowing of the gas within the tube 11 and outside the tube 11 are arranged to be approximately the same magnitude so that substantially no pressure difference is set up across the cylindrical wall 16 and the end wall 44, in other words the differential pressure exerted on the region of the tube 11 into contact with which the gas is brought is maintained substantially constant at zero pressure. Thus the frequency of the natural bell-like vibrations of the tube 11 is dependent primarily upon the density of the gas flowing through the density meter. The effect of variation of the temperature of the tube 11 can be rendered small for useful ranges of working conditions by the use of a suitable material for the tube 11.

In a gas-densitometer of the type shown in FIG. 1, the cylindrical wall 16 can be made as thin as two thousandths of an inch. The ferromagnetic alloy, of which the tube 11 is formed, is Ni-Span-C 902.

Ni-Span-C 902 is an iron-nickel-chromium alloy produced by the Huntingdon Alloy Products Division of the International Nickel Company, Incorporated, of Huntingdon, W. Va., and has the following limiting chemical composition:

|  | Percent |
|---|---|
| Nickel (plus cobalt) | 41.0–43.50 |
| Chromium | 4.90–5.75 |
| Titanium | 2.20–2.75 |
| Aluminum | 0.30–0.80 |
| Carbon (max.) | 0.06 |
| Manganese (max.) | 0.08 |
| Silicon (max.) | 1.00 |
| Sulphur (max.) | 0.04 |
| Phosphorus (max.) | 0.04 |
| Iron | Remainder |

Further details of the properties of Ni-Span-C 902 are given in Technical Bulletin T–31 of the Huntingdon Alloy Products Division.

The amplifier 19 is a conventional transistor amplifier encapsulated in thermoset synthetic resin such as Araldite 750/951 (trademark) or a ceramic material and includes a low-pass filter having a cut-off frequency below the second harmonic of the highest natural bell-like vibrations anticipated to arise in operation, the predominant frequency in the vibrations being in this embodiment the first harmonic, that is, the fundamental.

Referring now to FIG. 4 there is shown a liquid density meter embodying the present invention. The end wall 44′ of the tube 11′ in this embodiment is not provided with an aperture but instead fully closes one end of the tube 11′. The tube 11′ is mounted in a wall 55 of a container of a liquid of which the density is to be measured, the internally screw-threaded skirt of the flange 17 being secured in a sleeve 54 which is screw-threadedly engaged in a port in the wall 55. A sealing ring 56 is located between a flange on the sleeve 54 and the port in the wall 55.

The sleeve 54 houses a socket connector (not shown) which couples the drive coil 27 to the output of a maintaining amplifier (not shown), and couples the pick-up coil 28 to the input of the maintaining amplifier. Two conductors (not shown) embedded in the body 23 of thermoset synthetic resin connect opposite ends of the winding of the drive coil 27 to two male connector contacts 57 respectively, and two further conductors (not shown) embedded in the body 23 connect opposite ends of the winding of the pick-up coil 28 to two further male connector contacts 58 respectively. The two pairs of male connector contacts 57 and 58 make electrical contact with respective corresponding female connector contacts in the socket connector.

In operation, natural bell-like vibrations of the tube 11 are excited and maintained as described hereinbefore with reference to FIG. 1, the cylindrical wall 16′ of the tube 11′ vibrating in a manner similar to the vibration of the cylindrical wall 16 of FIG. 1. However, the space between the body 23 and the wall 16′ contains only air, the liquid in the container 55 being allowed to cover entirely the walls 44′ and 16′. The walls 16′ and 44′ are made sufficiently thick for changes in the pressure difference across the walls 16' and 44', which may be encountered in operation, to cause only negligible changes in the predominant frequency of the natural bell-like vibrations of the tube 11 in comparison with the changes in the predominant frequency which arise from changes in the density of the fluid, in other words the region of the tube 11' into contact with which the liquid is brought is substantially insensitive to variation in the differential pressure exerted thereon.

In one such liquid density meter the length of the wall 16' is approximately one and a half inches its thickness being thirty thousandths of an inch. The end wall 44' is several times thicker than the wall 16'. The rate of change in frequency was found to be approximately 0.2 c./s./p.s.i. over an operating range of 7300 c./s. to 8606 c./s. corresponding to a range of liquid density of 1.46 g.m./cc. to 0.79 gm./cc. The corresponding rate of change in frequency with temperature was 0.8 c./s./° C. on a range of temperature from 0° C. to 50° C.

The output circuit maintaining amplifier of the liquid density meter of FIG. 4 is also coupled to a frequency meter (not shown). The density of the liquid in the container 55 can be obtained by observing the frequency recorded by the frequency meter and converting to density by means of a calibration graph prepared from frequencies obtained when the tube 11' is immersed in standard liquids or the frequency meter can be directly calibrated in density from such a graph.

Figure 5:
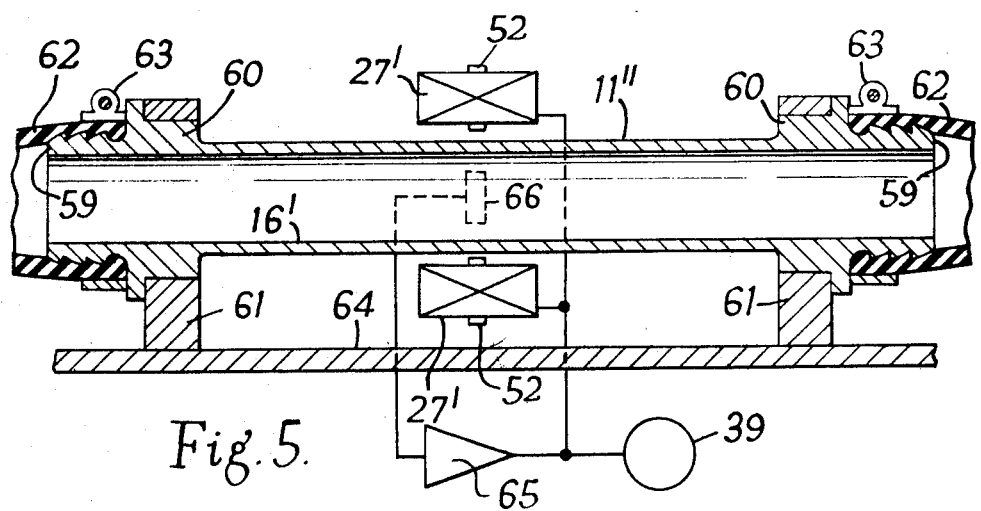
FIG. 5 is a simplified view, partially sectional, of a third embodiment of the invention.

In FIG. 5 there is shown a liquid density meter in the use of which a liquid can be passed continuously through the tube 11'', which is cylindrical.

Each end of the tube 11'' is formed as a nozzle 59 preceded by a collar 60, each collar being secured in a respective clamping block 61. The collars 60 serve to define nodes when the tube 11'' is vibrating. The bore of the tube 11'' is smooth and free from crevices. Respective rubber hoses 62 are clamped over the nozzles 59 by means of wormdrive clips 63. The clamping blocks are secured to a supporting platform 64 that serves as a base for the density meter.

The tube 11'' is formed of a magnetic steel, natural bell-like vibrations of the tube 11'' being, in operation, excited and maintained by a pair of drive coils 27' coupled to the output circuit of an amplifier 65, the input circuit of which includes two strain gauges, one being shown schematically at 66. The strain gauges are of the variable resistance type. A frequency meter 39 is also coupled to the output circuit of the amplifier 65. The drive coils 27' are so mounted (by means not shown) that there axes are aligned and are diametrically opposite one another with respect to the central cross-section of the tube 11''. The strain gauges are secured to the outer surface of the tube 11'' at diametrically opposite positions which are displaced by 90° relative to the positions of the drive coils 27' with respect to the longitudinal axis of the tube 11''. The phase of the signal generated by the input circuit of the amplifier 65 relative to the output current supplied to the drive coils 27' when the tube is executing natural bell-like vibrations is arranged to be such that the vibrations are maintained by power supplied to the drive coil 27'.

The liquid of which the density is to be measured is passed through the tube 11'' in sufficient volume to fill the bore of the tube entirely, the rubber hoses 62 being connected to means for supplying and removing the liquid. The thickness of the wall 16' of the tube 11'', the external surface of which is in contact with air, is such that changes in the pressure difference across the wall 16' encountered in operation cause only negligible changes in the predominant frequency of the natural bell-like vibrations of the tube 11'' in comparison with the changes in the predominant frequency which arise from changes in the density of the liquid.

The density of the liquid is obtained from the observations of the predominant frequency of the natural bell-like vibrations indicated by the frequency meter 39 as described hereinbefore with reference to FIG. 4.

Figure 6:
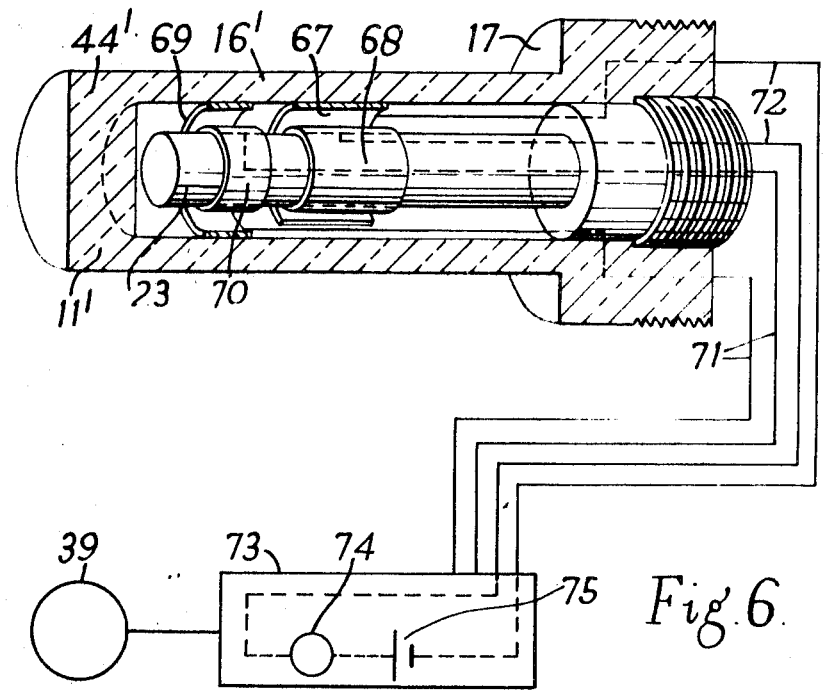
FIG. 6 is a simplified view, partially sectional, of a fourth embodiment of the invention.

FIG. 6 shows a liquid density meter in which the tube 11' is formed of dielectric ceramic material, for example Sintox (trademark). Natural bell-like vibrations of the tube are excited and maintained by means of a drive capacitor comprising two metal plates 67 and 68 plated on to respectively the inner surface of the wall 16' of the tube 11' and the outer curved surface of the body 23 of thermoset synthetic resin, and a pick-up capacitor comprising two further metal plates 69 and 70 plated onto respectively the inner surface of the wall 16' and the outer curved surface of the body 23. The plates 67, 68, 69 and 70 may be, for example, nickel with a protective coating of gold.

One pair of conductors 71 couple the pick-up capacitor to the input circuit of an amplifier 73, and another pair of conductors 72 couple the drive capacitor to the output circuit of the amplifier 73. The output circuit of the amplifier 73 is represented schematically as including an AC source 74 and a DC source 75 connected in series with the drive capacitor. The DC source 75 represents a bias voltage applied in operation to the drive capacitor to prevent frequency doubling, the AC source 74 representing the amplified signal fed back to the drive capacitor by the amplifier 73 and is of the same frequency as the signal picked up by the pick-up capacitor. The details of such circuitry are well known to a person skilled in the art and are therefore not described herein.

The space between the body 23 and the inner surface of the tube 11' is filled with air, and the wall 16' is sufficiently thick for changes in the pressure differences across the walls 16' and 44' to cause only negligible changes in the predominant frequency of the natural bell-like vibrations of the tube 11'. The operation of the liquid density meter shown in FIG. 6 is similar to that of the liquid density meter shown in FIG. 4, the liquid being supplied to the outer surfaces of the walls 16' and 44'.

Each of the plates 67, 68, 69 and 70 forms a complete ring. However, other embodiments can be constructed in which each of the rings is replaced by a plurality of separate plates electrically connected to one another.

Figure 7:
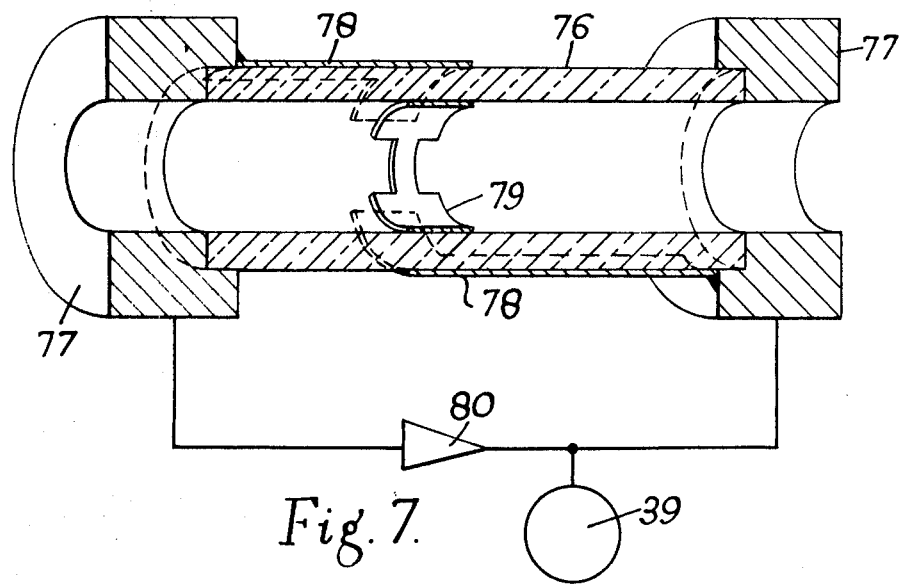
FIG. 7 is a simplified view, partially sectional, of a fifth embodiment of the invention.

Another liquid density meter which includes a hollow body through which a liquid can be passed during operation is shown in FIG. 7, the hollow body being in the form of a cylindrical shell 76 cut from a single crystal of quartz, the longitudinal axis of the shell being at an angle of about 5° to the Z-axis, that is, the optical axis of the crystal.

Each end of the shell 76 is secured in a massive metal port 77, each port 77 being electrically connected to a respective layer of metal 78 plated on to the outer curved surface of the shell 76. A third layer of metal 79 plated on to the inner surface of the shell 76 forms with the layers 78 an arrangement of conductive plates for piezoelectrically straining central cross-sections of the shell 76 in such a manner that natural bell-like vibrations of the shell can be excited. The arrangement comprises the capacitive coupling of a Pierce oscillator, which includes an amplifier 80 the input and output circuits of which are connected to respective ones of the ports 77. Natural bell-like vibrations of the shell 76 are excited and maintained in operation by the Pierce oscillator. The output of the amplifier 80 is also connected to the frequency meter 39 which indicate the predominant frequency of the vibrations.

The thickness of the wall of the shell 76 is such that changes in the difference in pressure across the wall encountered in operation are negligible.

Figure 8:
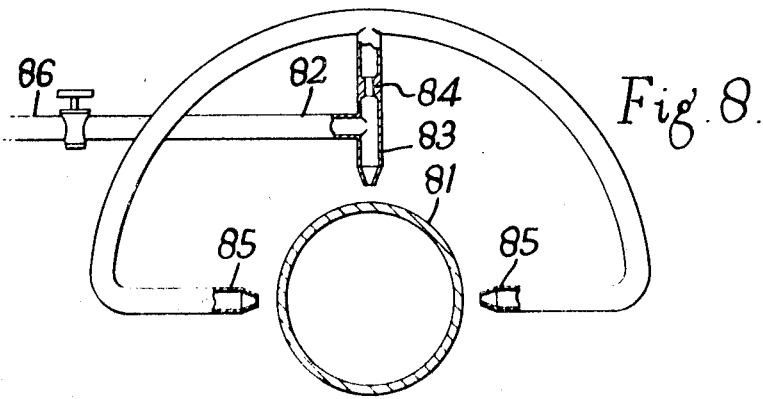
FIG. 8 is a cross-sectional simplified view of part of a sixth embodiment of the invention.

A liquid density meter in which natural bell-like vibrations of the hollow body, which is a tube 81, are excited and maintained pneumatically is partially shown in FIG. 8. Air under a pressure higher than atmospheric pressure is supplied in operation through a supply line 82 to a drive nozzle 83 and through a restrictor 84 to two pick-up nozzles 85. The pick-up nozzles 85 are diametrically opposed to one another relative to a cross-section of the tube 81 and each is angularly spaced from the drive nozzle 83 by 90° about the longitudinal axis of the tube 81.

A liquid of which the density is to be measured fills the bore of the tube 81 in operation, the wall of the tube being sufficiently thick for changes in the difference in pressure across the wall to be negligible in comparison with the changes in the density of the liquid in so far as the predominant frequency of natural bell-like vibrations of the tube 81 are concerned.

The vibrations are initially excited by the impulse received by the tube 81 from the jet of air directed thereon by the drive nozzle 83 when a control valve 86 is opened. The tube 81 at first distorts in the cross-section shown in FIG. 8 to an ellipse having its major axis aligned with the nozzles 85, thereby restricting the flow of air from the nozzles 85 and facilitating the flow of air from the nozzle 83. The cross-section of the tube 81 then returns elastically to its undistorted circular form shown in FIG. 8 and overshoots to become an ellipse having its major axis aligned with the drive nozzle 83, thereby restricting the flow of air from the nozzle 83 and facilitating the flow of air from the pick-up nozzles 85. It will be realised that the flow of air from the drive nozzle 83 is thus caused to pulsate at a frequency equal to the frequency of the natural bell-like vibrations of the tube 81, which are consequently maintained.

The predominant frequency of the vibrations can be measured by means of a frequency meter coupled to, for example, strain gauges (not shown) appropriately located on the tube 81.

Figure 9:
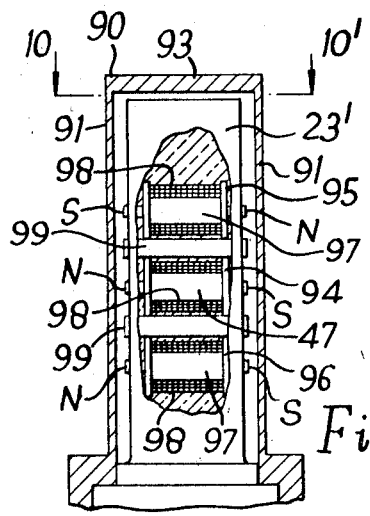
FIG. 9 is a partially sectional, simplified view of part of a seventh embodiment of the invention.
Figure 10:
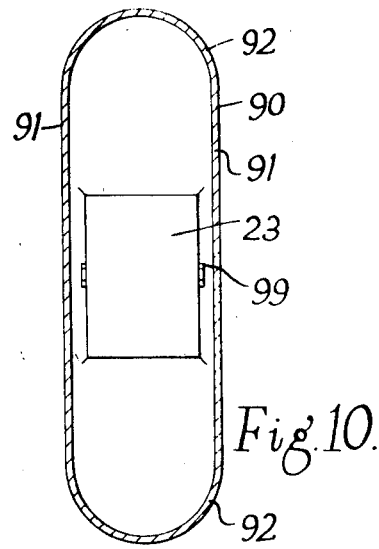
FIG. 10 is a cross-sectional view taken on the line 10–10' of FIG. 9.

Although the embodiments described hereinbefore all include tubular hollow bodies of circular cross-section, other embodiments can be constructed having hollow bodies which are neither tubular nor of circular cross-section. However, tubular hollow bodies are found preferable. The hollow body of a preferred embodiment is shown in FIGS. 9 and 10. The hollow body comprises a flat tube 90 formed of ferromagnetic metal and having a pair of plane side walls 91 and a pair of curved edge walls 92, one end of the tube 90 being closed by a plane end wall 93. The side walls 91 are parallel to and opposite one another, and their widths are larger than their separation from one another. In operation, natural bell-like vibrations of the tube 90 are excited by means of an assembly including a drive coil 94 and two pick-up coils 95 and 96. The axes of the coils 94, 95 and 96 lie in a plane that contains the longitudinal axis of the tube 90 and is perpendicular to the side walls 91 and are perpendicular to the longitudinal axis of the tube 90. Each of the coils 94, 95 and 96 includes a respective biasing winding 97 and a respective signal winding 98 wound on an insulating former. A respective soft iron core is provided for each coil, the polarities established therein by the respective biasing windings in operation being indicated by the letters N and S representing respectively north and south poles. Two soft iron magnetic shunts 99 serve to shield the pick-up coils 95 and 96 from the magnetic field of the drive coil 94.

Further shielding is provided by virtue of the orientation of the polarities of the pick-up coils 95 and 96, the biasing fields of which link together through the side walls 91 of the tube 90 to form a magnetic circuit. Three DC sources (not shown) are coupled to the three biasing windings 97, respectively through conductors (not shown) embedded within the said assembly in the body 23' of synthetic thermoset resin.

The output circuit of an amplifier (not shown) is coupled to the signal winding 98 of the drive coil 94, the input circuit of the amplifier being coupled to the signal windings 98 of the pick-up coils 95 and 96. Natural bell-like vibrations of the tube 90 can be excited and maintained by feedback from the signal windings 98 of the pick-up coils 95 and 96, which sense vibration of the side walls 91, through the amplifier to the signal windings 98 of the drive coil 94.

The space between the body 23' and the internal surfaces of the walls 91, 92 and 93 of the tube 90 is filled with air, and tube 90 is, in operation, so immersed in a liquid of which the density is to be measured that the outer surfaces of the walls 91, 92 and 93 are covered by the liquid. The walls of the tube 90 are sufficiently thick for changes in the pressure difference across the walls to be negligible so far as changes in the predominant frequency of the natural bell-like vibrations are concerned. A frequency meter (not shown) is also coupled to the output circuit of the amplifier for indicating the frequencies of the vibrations.

Figure 11:
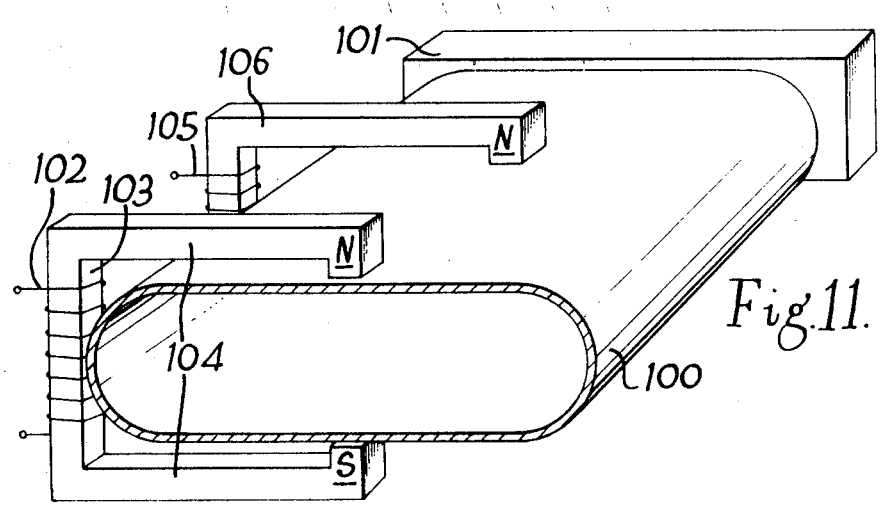
FIG. 11 is a simplified perspective view of an eighth embodiment of the invention.

FIG. 11 shows another embodiment that includes a tube 100 formed of ferromagnetic metal and having a non-circular cross-section similar to the tubes shown in FIGS. 9 and 10. The ends of the tube 100 are secured in metal mounting blocks, one of which is shown at 101. The mounting blocks provide inlet and outlet ports to the interior of the tube 101, which in operation is filled with a liquid the density of which is to be measured.

A drive coil 102 has a core comprising a short permanent bar magnet 103 provided with soft iron pole pieces 104, the pole piece of the north pole of the magnet 103 being indicated by the letter N and the pole piece of the south pole of the magnet being indicated by the letter S. The core of the drive coil 102 is so mounted that the ends of the pole piece 104 remote from the magnet 103 are adjacent the midpoints of the plane side walls of the tube 100, one-half of the tube 100 being shown in FIG. 11.

A pick-up coil 105 having a core 106 similar to the core of the drive coil 103 is so mounted between the drive coil 103 and the mounting block 101 that the ends of the core 106 lie in a plane containing the longitudinal axis of the tube 100. The pole pieces of like poles of the permanent magnets of the cores are situated on the same side of the tube 100. In operation, natural bell-like vibrations of the tube 100 are excited and maintained by feedback from the pick-up coil 105 to the drive coil 103 through an amplifier (not shown) and the frequency of the vibrations is indicated by a frequency meter (not shown) coupled to the output circuit of the amplifier, as in the embodiment shown in FIG. 4. The walls of the tube 100 are sufficiently thick for changes in the difference in pressure across the walls to be negligible, as in the embodiments shown in FIGS. 4, 5, and 9.

An advantage of the non-circular cross-section of the tubes 90 and 100 is shown in FIGS. 10 and 11 in comparison with tubes of circular cross-section is that the predominant frequency of the natural bell-like vibrations of the tubes of such non-circular cross-section is more sensitive to variations in the density of the liquid.

Referring again to FIG. 1, embodiments can be constructed substantially as shown in FIG. 1 but having a hollow body with a cross-section as shown in FIG. 10, the body 23 being replaced by the body 23', shown in FIG. 9, modified by the inclusion of the tubes 35 and 36. The DC sources for supplying the biasing windings 97 in such embodiments can be encapsulated with an amplifier in the same manner as the amplifier 19 shown in FIG. 1, and the thickness of the walls 91 and 92 of the tube 90 can be substantially less than is the case in embodiments in which the fluid is brought into contact with either an external or an internal surface only of the tube.

Other embodiments of the present invention can be constructed having means for exciting natural bell-like vibrations in a hollow body comprising, for example, magneto-strictive apparatus or a mechanical striking mechanism that excites damped vibrations which are allowed to die away, the hollow body being struck once for each frequency reading required.

Furthermore, embodiments can be constructed in which the means for exciting natural bell-like vibrations of the hollow body comprise a variable-frequency electrical oscillator having its output coupled to the hollow body. In such an embodiment the means for generating a signal representative of the predominant frequency of the vibration can comprise the variable-frequency electrical oscillator, which may be calibrated to read directly in density units. In operation, the frequency of the variable-frequency oscillator is varied until means for sensing the amplitude of the vibrations of the hollow body indicate a maximum in the amplitude, the frequency at which this occurs being the predominant frequency of the natural bell-like vibrations.

Although in the embodiments described with reference to the drawings natural bell-like vibrations are excited, further embodiments can be constructed in which other modes of natural vibration are excited such as natural transverse vibrations, natural longitudinal vibrations, and natural flexival vibrations. Furthermore, embodiments in accordance with the invention can be constructed in which a frequency other than the predominant frequency of the natural vibrations is measured, such frequency being by virtue of the construction and operation of embodiment rendered insensitive to variations in differential pressure.

For the purpose of determining the thickness of wall sufficient to render a frequency of the natural vibrations of a hollow body substantially insensitive to variations in differential pressure, use may be made of the equation $$f^2 = f_0^2 \times \frac{(1+p/p_0)}{\left(1+\dfrac{D}{D_1}\right)\left(1+\dfrac{D^1}{D_2}\right)}$$

where $f$ is the resonant frequency of the hollow body,
$f_0$ is a constant,
$p$ is the differential pressure taken to be positive when acting from the interior to the exterior of the hollow body,
$p_0$ is a constant dependent upon the size, shape, and material forming the hollow body,
$D$ is the density of the fluid within the hollow body acting on the wall,
$D^1$ is the density of the fluid outside the hollow body acting on the wall, and
$D_1$ and $D_2$ are constants dependent upon the dimensions, material and shape of the hollow body.

The dependence of the constants $p_0$, $D_1$, $D_2$ on the thickness of the wall can be determined empirically.

Thus it is possible to determine the required thickness of a wall of an embodiment in which the fluid of which the density is to be measured is applied to the interior or to the exterior only of the hollow body, and the range of pressure over which a frequency of the hollow body is substantially insensitive to variations in the differential pressure.

I claim:

1. Apparatus for measuring the density of a fluid comprising the combination of a hollow vibratory body of resilient material, a support for said hollow body, means for exciting natural bell-like vibrations of said hollow body, means for supplying a fluid, the density of which is to be measured, to external and internal surfaces of said hollow body at equal pressures, means for sensing the vibratory motion of said hollow body and for generating an electrical signal representative of the predominant frequency of said vibrations; and means responsive to the frequency of said electrical signal for providing a measure of density of the fluid.

2. A density meter as claimed in claim 1, wherein said hollow body comprises a tube mounted within a chamber having an inlet port and an outlet port for said fluid, said inlet port communicating directly with the interior of said tube and said tube being apertured for passage of said fluid from the interior thereof to said outlet port.

3. A density meter as claimed in claim 2, wherein said resilient material is a ferromagnetic metal, said means for exciting said vibrations includes a drive coil, and said means for generating said signal includes at least one pick-up coil, a conduit for said fluid communicating directly with the interior of said tube and with said inlet port being mounted together with said coils in a body of supporting material.

4. A density meter as claimed in claim 2, wherein said resilient material is a ferromagnetic metal, said means for exciting said vibrations includes a drive coil, and said means for generating said signal includes a pick-up coil, said coils being so mounted within said tube that the axes of said coils intersect the longitudinal axis of said tube perpendicularly and lie in mutually perpendicular planes.

5. A density meter as claimed in claim 4, wherein said drive coil is coupled to the output circuit of an amplifier, said pick-up coil is coupled to the input circuit of said amplifier, and said vibrations are maintained by feedback from said pick-up coil to said drive coil through said amplifier.

6. A density meter as claimed in claim 5, wherein said drive-coil and said pick-up coil are mounted in a body of supporting material.

7. A density meter as claimed in claim 6, wherein a conduit for said fluid communicating directly with the interior of said tube and with said inlet port is mounted in said body of supporting material, said supporting material being thermoset synthetic resin.

8. Apparatus for measuring the density of a fluid comprising the combination of a hollow vibratory member having a cylindrical wall, an open end, a wall at the other end, and a plurality of apertures in said cylindrical wall, said end wall having a circular opening therethrough; a support body within said vibratory member; closure means for closing the open end of said vibratory member and for supporting said support body coaxially with said vibratory member, said support body having a blunt end in close proximity with said circular opening to form an annular passage; means for exciting said member into vibration; conduit means extending through said closure means and said support body for supplying fluid to the interior of said vibratory member, said apertures in said cylindrical wall being effective to allow passage of fluid from the interior to the exterior of said vibratory member to eliminate pressure differential therebetween; and housing means for enclosing said vibratory member, said housing means having a fluid outlet.

9. Apparatus according to claim 8 wherein said vibratory member comprises a ferromagnetic metal.

10. Apparatus according to claim 9 wherein said support body includes coil means for detecting relative vibratory motion between said support body and said vibratory member.

11. A method of measuring the density of a fluid comprising the steps of passing the fluid both through the interior of and around the exterior of a hollow vibratory member in such fashion that a first portion of the flowing fluid stream contacts the inner surface of the member while a second portion of the fluid stream simultaneously contacts the external surface of the member and the internal and external pressures on the member are equal; inducing vibrations of the member while in the medium of the fluid; sensing and measuring a predominant frequency of the vibrations as a measure of the density of the fluid; and using the sensed vibrations to sustain vibrations of the vibratory member.

12. A method of measuring the density of a fluid comprising the steps of immersing a hollow vibratory member in the fluid in such fashion that the fluid is in contact with both the internal and external surfaces of the hollow member and so that the internal and external pressures of the fluid on the member are equal; inducing vibrations of the member while in the medium of the fluid; sensing and measuring a predominant frequency of the vibrations as a measure of the density of the fluid; and using the sensed vibartions to sustain vibrations of the vibratory member.

References Cited

UNITED STATES PATENTS

| | | | |
|---|---|---|---|
| 3,145,559 | 8/1964 | Banks | 73—32 |
| 2,635,462 | 4/1953 | Poole et al. | 73—32 |
| 3,177,705 | 4/1965 | Banks | 73—54 |

FOREIGN PATENTS 827,344   2/1960   Great Britain.

OTHER REFERENCES

Electrical Design News, June 1961, bulletin published by Co-Engineering Co.

JAMES J. GILL, Primary Examiner

E. J. KOCH, Assistant Examiner

U.S. Cl. X.R.

73—32